United States Patent Office 2,795,109
Patented June 11, 1957

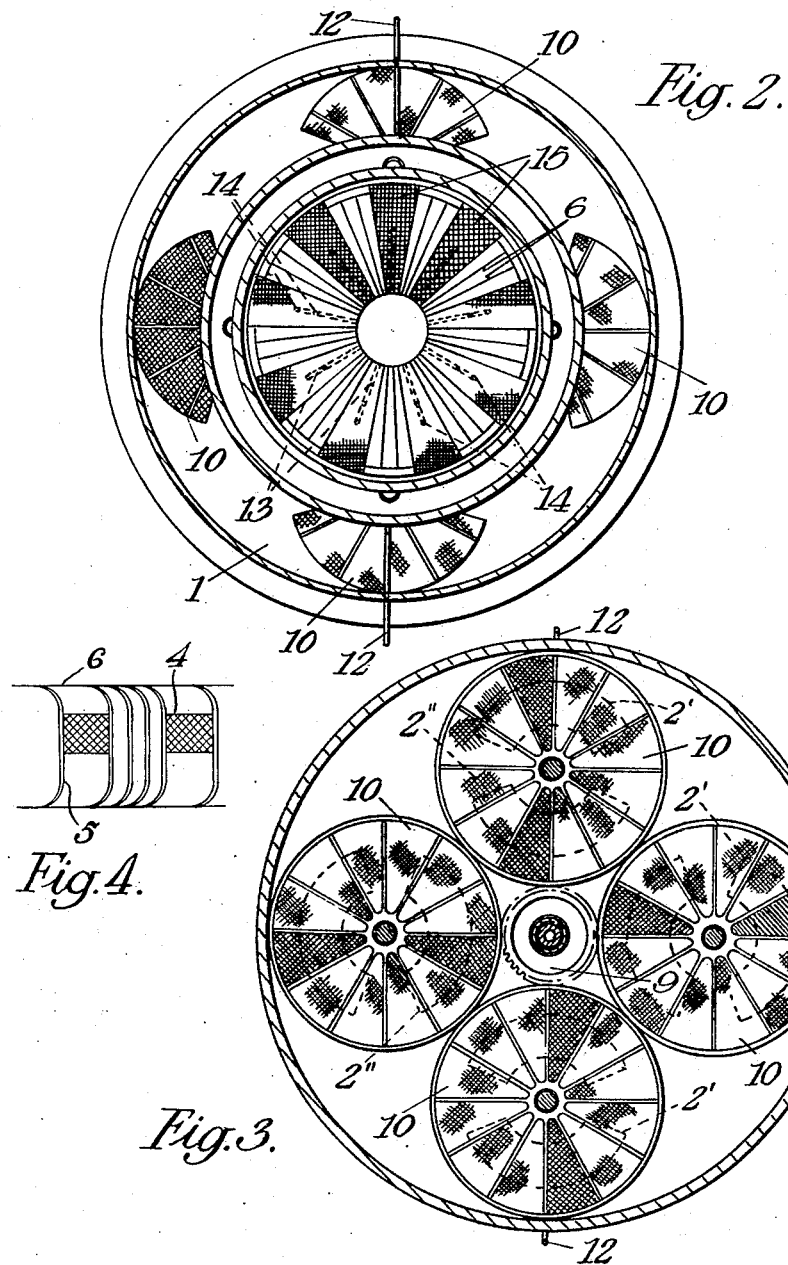

2,795,109

COMBINED COMBUSTION CHAMBER, HEAT EXCHANGER AND FLAME TRAP FOR COMBUSTION TURBINE PLANTS

Waldemar Hryniszak, Newcastle-upon-Tyne, England, assignor to C. A. Parsons & Company Limited, Newcastle-upon-Tyne, England Application June 8, 1953, Serial No. 360,260

Claims priority, application Great Britain June 23, 1952

2 Claims. (Cl. 60—39.51)

This invention relates to combustion turbines and more particularly to heating units for combustion turbines.

The object of the present invention is to provide an improved combustion turbine heating unit reducing or minimizing the difficulty of mixing the combustion gases with the secondary air at comparatively low velocities in a relatively small space so as to form a gas mixture of uniform temperature.

Referring to the accompanying diagrammatic drawings:

Figure 2 shows a front view of the unit shown in Figure 1 looking from the left towards the right of Figure 1;

Figure 3 is a section on the line 3—3 of Figure 1 looking in the direction of the arrows;

Figure 4 is a detail elevation view of the flame trap blading of Figure 1.

Figure 1:
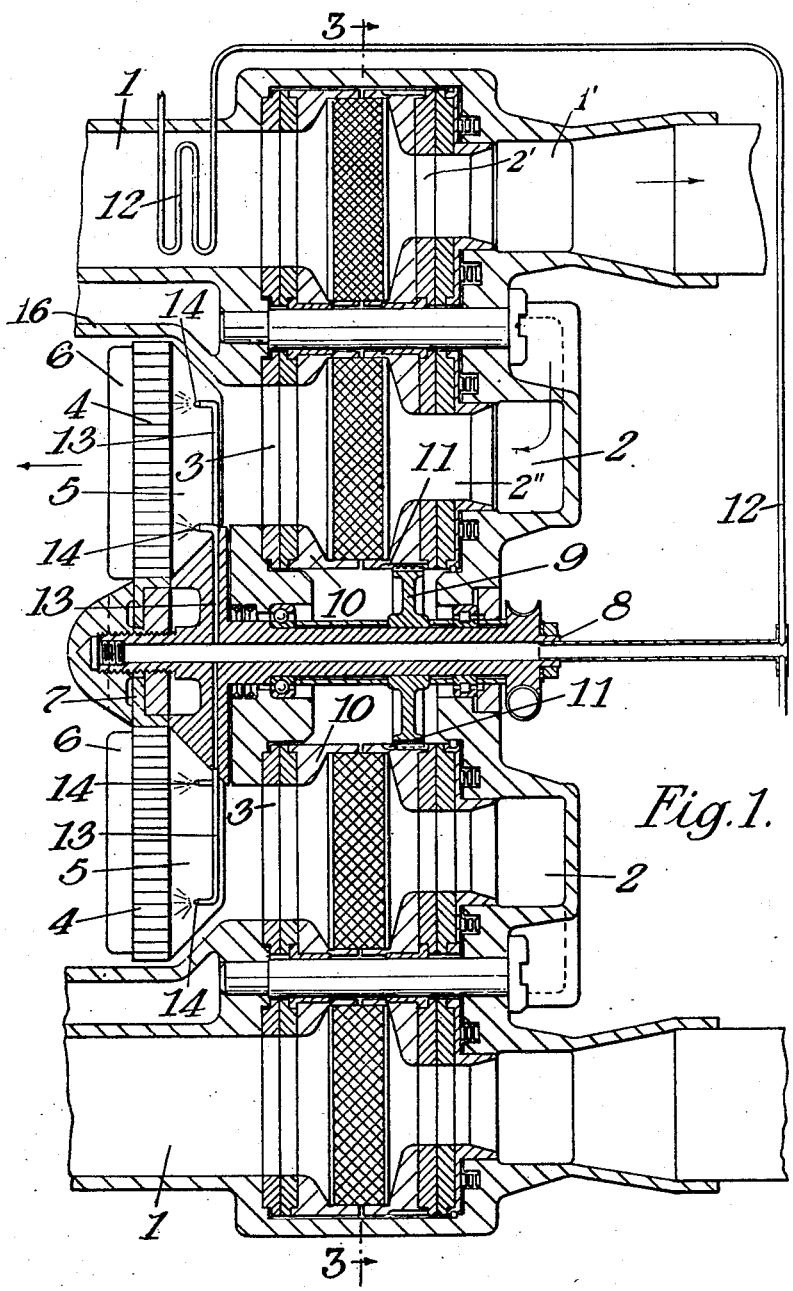
Figure 1 is a longitudinal sectional elevation of a heating unit with rotating flame trap according to one form of the present invention.

In carrying the invention into effect in the form illustrated by way of example, I employ a regenerative heat exchanger of the type described in my patent application Serial No. 327,627, filed December 23, 1952, that is to say one which has a multiple disc rotor. I replace the single large disc by a number of smaller discs rotating about their own axes, thus splitting the total frontal area of the regenerator into a number of separate partial areas which reduce the distortion in the sealing area and at the same time reduce the speed of the rotor. With such an arrangement the hot and cold gas sides are unified on two separate annuli which unification enables the two sides to be suitably connected to the outlets of the turbine and compressor and the inlets of the exhaust duct and the combustion chamber without interleaving ducts.

Referring now particularly to Figure 1, hot exhaust gas from a turbine enters the air preheater via an outside annulus 1 and cold air from a compressor enters via the inside annulus 2. Near the annular outlet 3 for heated air leaving the air preheater and in the inlet of a combustion chamber 16 is arranged a rotary flame trap 4. The outlets communicating with the hot gas exhaust annulus 1' and the cold gas inlet annulus 2 have a nearly semi-circular configuration, as indicated at 2' and 2" in Fig. 3. The flame trap is fitted with inlet vanes 5 and outlet vanes 6, the vanes 5 serving to divide the heated air into two streams, one of which, hereinafter called the primary air, is mixed with a fuel, whilst the other stream, hereinafter called the secondary air, mixes with the fuel and primary air downstream of the flame trap. The rotation of the flame trap enables the two streams to mix intimately in a small space so as to form a gas mixture of uniform properties. A wheel 7 incorporating the flame traps 4 is mounted on the same shaft 8 as a gearwheel 9 which drives rotor 10 of the air preheater elements by meshing with adjustable gear 11 on the outer surface of the rotors near to their coolest parts. The aforesaid wheel 7 can also be driven by the impinging gases themselves, say, for instance, by suitably shaping the vanes 5 and 6 and the flame trap 4 or both, as shown in Figure 4.

The fuel is vaporized in a heating coil 12 and then led through a hollow shaft 8 to distributing pipes 13 with nozzles 14.

Referring now particularly to Figure 2 this shows a flame trap made up of alternate honeycomb sections 15 through which the primary air passes together with the vaporized fuel injected into it by nozzles 14, before entering the honeycomb sections. The secondary air passes through the intervening compartments the vanes 6 of which may be curved to aid mixing of the air after the flame trap.

The arrangement of the discs of the heat exchanger in accordance with my aforesaid application Serial No. 327,627 is brought out in Figure 3.

*General*

With a flame trap which rotates as described a better mixing of the combustion gases from the fuel and primary air with the secondary air is achieved in a combustion chamber of smaller space than that required for systems with stationary flame traps.

The secondary air is mixed intimately with the fuel and primary air and with the combustion products therefrom and as said secondary air is in the nature of excess air, it helps to reduce the temperature of the flame and consequently the temperature of the combustion chamber walls.

The passage of vaporized fuel and primary air to the flame trap may be at a low velocity say 7 to 10 feet per second, the mixture burning a short distance in front of the flame trap with a non-luminous flame, which is say one to two inches long, the flame trap being of large area, but the invention is in no way limited to these figures.

I claim:

1. In a combustion turbine plant, a combined heating unit for the turbine working fluid which heating unit comprises a rotary regenerative heat exchanger having a plurality of disc type rotors each containing heat storing material, a common stator for said rotors, means mounting the said rotors in the stator spaced from each other and for rotation about respective axes symmetrically disposed with reference to a predetermined axis, drive means for rotating the said rotors about their respective axes and fluid supply and discharge openings in said stator for air to be heated and gas to be cooled, the openings for air lying within an annulus symmetrically disposed with respect to said predetermined axis and the openings for gas lying within a separate annulus with respect to said predetermined axis, a combustion chamber symmetrically disposed about said predetermined axis and having an annular inlet portion disposed adjacent the said openings for discharge of the air after it has been heated in the heat exchanger, flame trap and gas mixing means situated in said inlet portion of the combustion chamber, said means comprising a disc composed of flame trap sectors, containing material for distributing air substantially equally over its area and for preventing flashback from the combustion chamber to the inlet side of said disc, alternated with sectors containing vanes for imparting swirling motion to air passing therethrough, means for introducing a vaporized fuel on the inlet side of said flame trap sectors, and means for rotating said disc.

2. A combined heating unit having a rotary flame trap and gas mixer in accordance with claim 1, in which the said vanes are shaped for causing rotation of the flame trap by means of the air passing between the said vanes.

(References on following page)

References Cited in the file of this patent

UNITED STATES PATENTS

| | | |
|---|---|---|
| 981,978 | Coleman | Jan. 17, 1911 |
| 1,516,108 | Ljungström et al. | Nov. 18, 1924 |
| 2,399,394 | Seippel | Apr. 30, 1946 |
| 2,551,112 | Goddard | May 1, 1951 |
| 2,630,678 | Pratt | Mar. 10, 1953 |
| 2,667,034 | Alcock | Jan. 26, 1954 |